United States Patent
Lin

(10) Patent No.: US 7,587,310 B2
(45) Date of Patent: Sep. 8, 2009

(54) SOUND PROCESSOR ARCHITECTURE USING SINGLE PORT MEMORY UNIT

(75) Inventor: David H. Lin, San Jose, CA (US)

(73) Assignee: LSI Corporation, Milpitas, CA (US)

(*) Notice: Subject to any disclaimer, the term of this patent is extended or adjusted under 35 U.S.C. 154(b) by 842 days.

(21) Appl. No.: 10/931,151

(22) Filed: Aug. 30, 2004

(65) Prior Publication Data

US 2006/0047519 A1  Mar. 2, 2006

(51) Int. Cl.
*G10L 13/04* (2006.01)
*G06F 13/00* (2006.01)

(52) U.S. Cl. .................. 704/200; 704/258; 711/147; 711/167

(58) Field of Classification Search .............. 704/200, 704/201, 258, 270, 278; 711/147, 150, 151, 711/167, 169; 381/2
See application file for complete search history.

(56) References Cited

U.S. PATENT DOCUMENTS

| | | | | |
|---|---|---|---|---|
| 4,901,230 A | * | 2/1990 | Chen et al. ................. 711/149 |
| 5,561,736 A | * | 10/1996 | Moore et al. ............... 704/260 |
| 5,761,537 A | * | 6/1998 | Sturges et al. ............... 710/72 |
| 5,787,488 A | * | 7/1998 | Garde ........................ 711/169 |
| 6,128,705 A | * | 10/2000 | Arimilli et al. .............. 711/141 |
| 6,223,276 B1 | * | 4/2001 | Lee et al. .................... 712/207 |
| 6,484,254 B1 | * | 11/2002 | Chowdhury et al. ........ 712/216 |
| 6,567,426 B1 | * | 5/2003 | van Hook et al. ........... 370/535 |
| 6,578,131 B1 | * | 6/2003 | Larson et al. ............... 711/216 |
| 6,643,744 B1 | * | 11/2003 | Cheng ........................ 711/137 |
| 6,859,866 B2 | * | 2/2005 | Dahlen et al. ............... 711/168 |
| 7,030,930 B2 | * | 4/2006 | Kovacevic .................. 348/515 |
| 7,058,838 B2 | * | 6/2006 | Xu ............................. 713/400 |
| 7,107,110 B2 | * | 9/2006 | Fay et al. .................... 700/94 |
| 7,130,947 B2 | * | 10/2006 | Barrick ....................... 710/243 |
| 7,257,091 B2 | * | 8/2007 | Elko et al. ................... 370/276 |
| 7,333,618 B2 | * | 2/2008 | Shuttleworth et al. ......... 381/57 |
| 2002/0126703 A1 | * | 9/2002 | Kovacevic .................. 370/487 |
| 2005/0063552 A1 | * | 3/2005 | Shuttleworth et al. ......... 381/57 |
| 2005/0088981 A1 | * | 4/2005 | Woodruff et al. ............ 370/260 |
| 2006/0136228 A1 | * | 6/2006 | Lin ............................. 704/278 |
| 2006/0173690 A1 | * | 8/2006 | Lin ............................. 704/278 |

* cited by examiner

*Primary Examiner*—Martin Lerner
(74) *Attorney, Agent, or Firm*—Strategic Patent Group, P.C.

(57) ABSTRACT

A system and method for implementing a sound processor. The sound processor includes a first voice engine, a second voice engine, and at least one single-port memory unit. An operation of the first voice engine and an operation of the second voice engine are time offset, wherein the time offset enables the first and second voice engines to share the at least one memory unit without contention. This results in cost savings and power consumption savings due to the smaller area needed for the memories.

38 Claims, 6 Drawing Sheets

SOUND PROCESSOR ARCHITECTURE USING SINGLE PORT MEMORY UNIT

FIELD OF THE INVENTION

The present invention relates to sound processors, and more particularly to implementing a sound processor.

BACKGROUND OF THE INVENTION

Sound processors produce sound by controlling digital data, which is transformed into a voltage by means of a digital-to-analog converter (DAC). This voltage is used to drive a speaker system to create sound. Sound processors that are wave-table-based use sound data from memory as a source, and modify that sound by: altering the pitch; controlling the volume over time; transforming the sound through the use of filters; and employing other effects.

Polyphonic sound processors create multiple sounds simultaneously by creating independent sound streams and adding them together. Each separate sound that can be played simultaneously is referred to as a voice, and each voice has its own set of control parameters.

2-dimensional (2D) sound refers to sounds that are produced in such a way that the listener perceives them as originating from the left or from the right in 2D space relative to the listener.

3-dimensional (3D) sound refers to sounds that are produced in such a way that the listener perceives them as originating at any point in 3D space relative to the listener. Sound processors that process 3D sound require additional processing time to produce 3D sound.

Generating 3D sound requires much more processing than generating 2D sound. If all voices were to be capable of generating 3D sound, the necessary hardware to generate the voices, and the power consumption of the hardware would be greatly increased. In many applications, it is not necessary for all voices to be 3D, since sounds such as background music are generally 2D.

To allow efficient processing of 3D sound and 2D sound, it is possible to include separate 2D and 3D voice engines. However, this necessitates a method to alleviate contention for common resources between the 3D voice engine and 2D voice engine. Typical methods of alleviating the contention are to have separate RAMs, to have dual-ported RAMs, or to stall one of the engines when contention for a resource occurs. All of these methods have a die size or performance penalty.

Accordingly, what is needed is a more efficient system and method for implementing a sound processor. The system and method should be able to perform low-power operations, and should be simple, cost effective and capable of being easily adapted to existing technology. The present invention addresses such a need.

SUMMARY OF THE INVENTION

The present invention provides a sound processor. According to the method and system disclosed herein, the sound processor includes a first voice engine, a second voice engine, and at least one single-port memory unit. An operation of the first voice engine and an operation of the second voice engine are time offset, wherein the time offset enables the first and second voice engines to share the at least one memory unit without contention. This results in cost savings and power consumption savings due to the smaller area needed for the memories.

DETAILED DESCRIPTION OF THE INVENTION

The present invention relates to sound processors, and more particularly to implementing a sound processor. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

The present invention provides describes a sound processor, which in a preferred embodiment may process 48 2D voices and 16 3D voices at 24 MHz operation. The sound processor also achieves low-cost and low-power operation with an efficient architecture that staggers 2D voice engine and 3D voice engine pipelines and uses single-port RAMs.

Although the present invention disclosed herein is described in the context of sound processors, the present invention may apply to other types of processors and still remain within the spirit and scope of the present invention.

Figure 1:
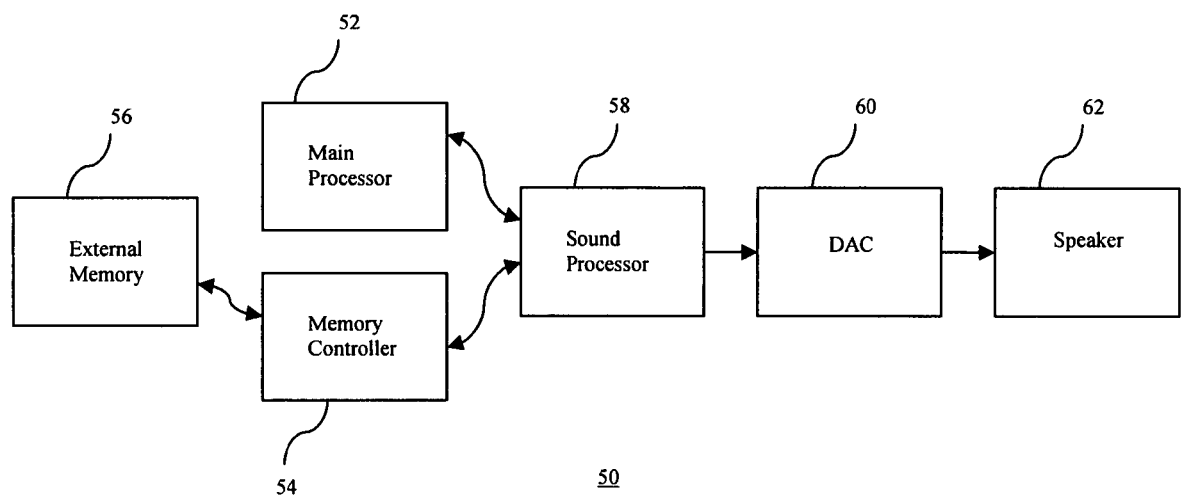
FIG. 1 is a block diagram of a sound system.

FIG. 1 is a block diagram of a sound system 50. The sound system 50 includes a main processor 52, a memory controller 54, an external memory 56, a sound processor 58, a DAC 60, and a speaker system 62. In operation, generally, the main processor 52 reads from and writes to the sound processor 58, and the memory controller 54 fetches sound data from the external memory 56 and sends the sound data to the sound processor 58. The sound processor 58 outputs processed sound data to the DAC 60. The DAC 60 converts the sound data from digital to analog and then sends the sound data to the speaker system 62.

Figure 2:
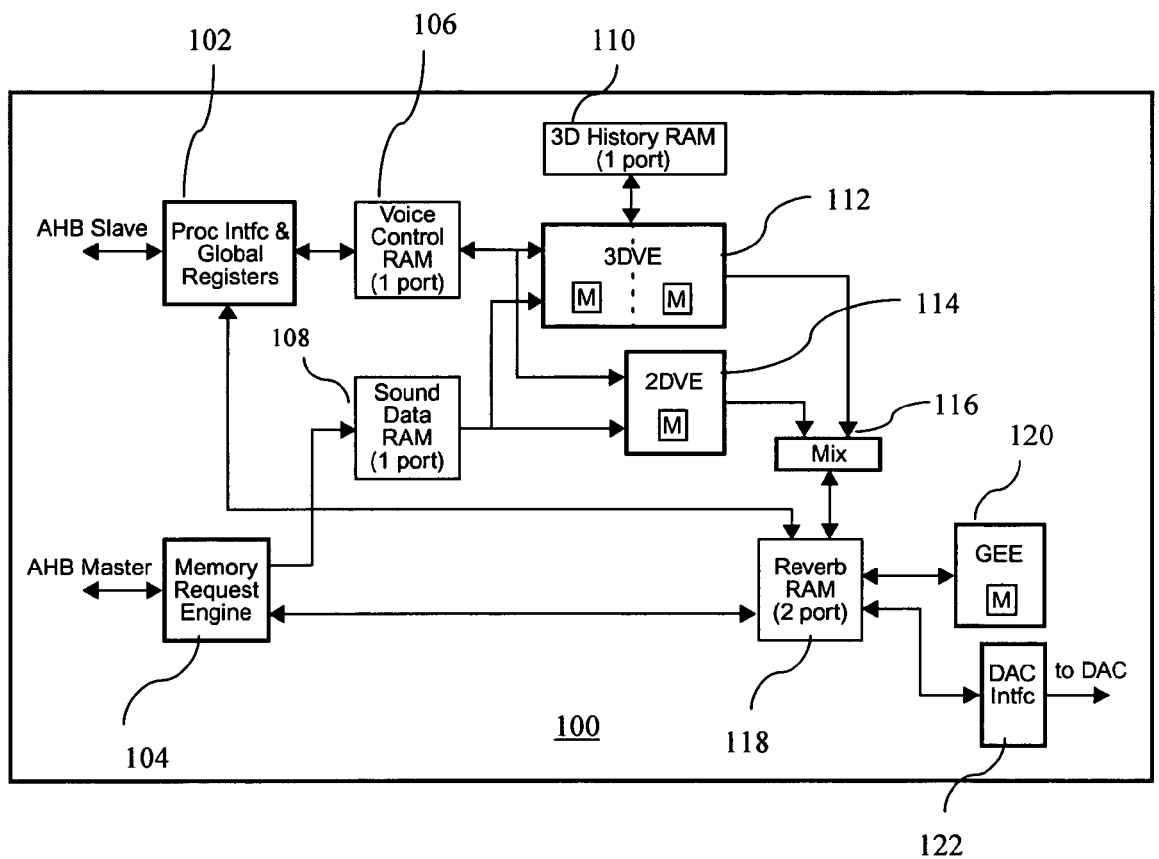
FIG. 2 is a block diagram of a sound processor, which can be used to implement the sound processor of FIG. 1, in accordance with the present invention.

FIG. 2 is a block diagram of a sound processor 100, which can be used to implement the sound processor 58 of FIG. 1, in accordance with the present invention. The sound processor 100 includes a processor interface (PIF) 102, a memory request engine (MRE) 104, a voice control RAM 106, a sound data RAM 108, and a 3D history RAM 110, a 3D voice engine (3DVE) 112, a 2D voice engine (2DVE) 114, a mixer 116, a reverb RAM 118, a global effects engine (GEE) 120, and a DAC Interface 122. For ease of illustration, the voice control RAM 106, the sound data RAM 108, and the 3D history RAM 110, the 3DVE 112, and the 2DVE 114 are described first in conjunction with FIG. 3 below.

Figure 3:
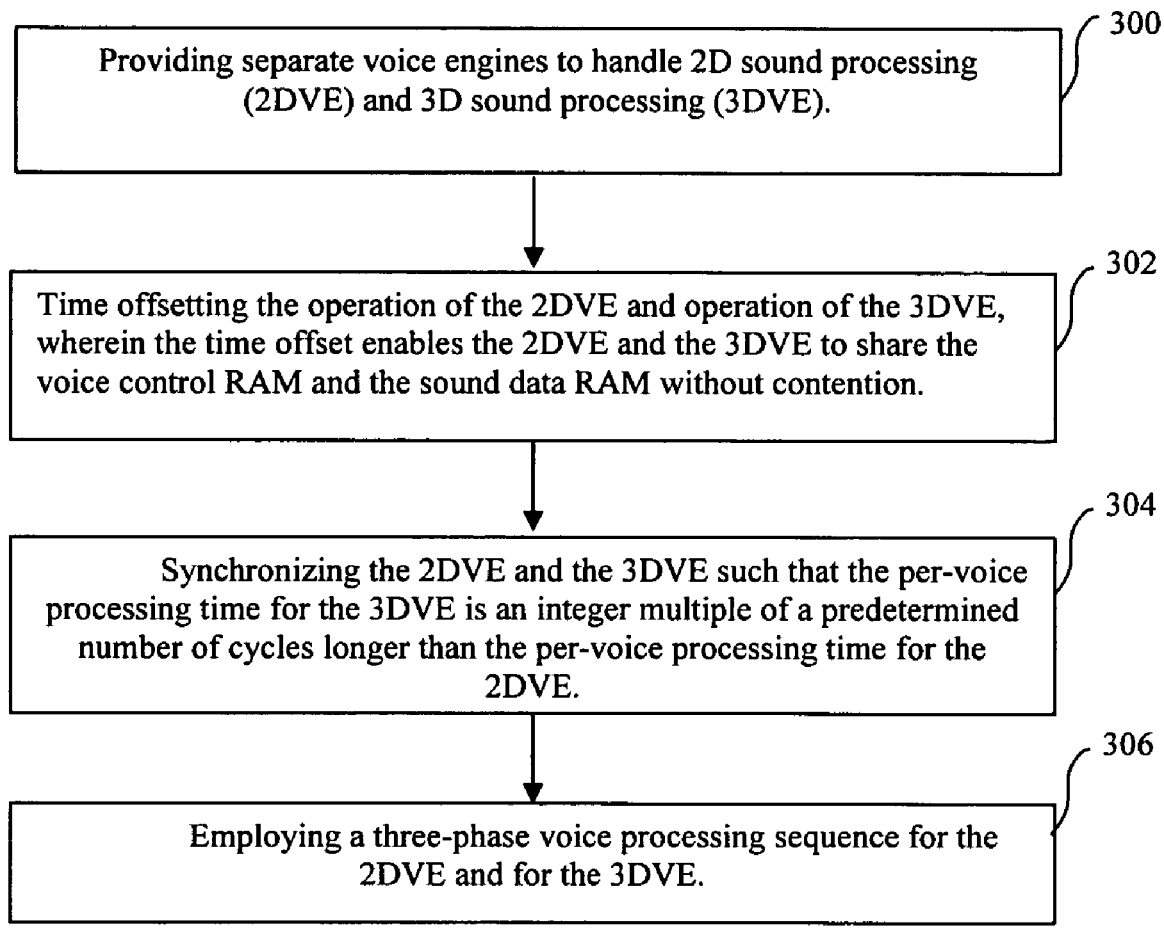
FIG. 3 is a flow chart showing a method for implementing the sound processor of FIG. 2, in accordance with the present invention.

FIG. 3 is a flow chart showing a method for implementing the sound processor 100 of FIG. 2, in accordance with the present invention. Referring to both FIGS. 2 and 3 together, separate voice engines 2DVE 114 and 3DVE 112 are provided to handle 2D sound processing and 3D sound processing, respectively, in a step 300. The operation of the 2DVE 114 and operation of the 3DVE 112 are time offset, wherein the time offset enables the 2DVE 114 and the 3DVE 112 to share the voice control RAM and the sound data RAM without contention, in a step 302.

Having separate 3D and 2D voice engines allows the sound processor to operate at lower clock speeds. In this specific example, it can operate at a clock speed of as low as 24 MHz (for 48 2D voices and 16 3D voices). Of course, the specific clock speed will vary and will depend on the specific application. Because the operations of the 2DVE 114 and the 3DVE 112 are time offset, the voice control RAM 106 and the sound data RAM 108 can be single-port RAMs without compromising performance. The voice control RAM 106 and the sound data RAM 108 require less silicon area and less power to operate, because they are single-port RAMs. Furthermore, despite being single-port RAMs, they do not require arbitration logic and require no extra logic for resolving contention on the single RAM port. Accordingly, the lower clock speed and the use of smaller single-port RAMS enables the sound processor to consume less power overall.

The 2DVE 114 and the 3DVE 112 are synchronized such that the per-voice processing time for the 3DVE 112 takes an integer multiple of a predetermined number of cycles longer than the per-voice processing time for the 2DVE 114, in a step 304. In this specific embodiment, the integer multiple is 3. This multiple allows the voice engines to remain in sync even though one voice engine (the 3DVE 112) requires more processing time than the other (the 2DVE 114). The integer can be greater and the specific integer used will depend on the specific application.

Finally, a three-phase voice processing sequence is employed for the 2DVE 114 and for the 3DVE 112, in a step 306.

Figure 4:
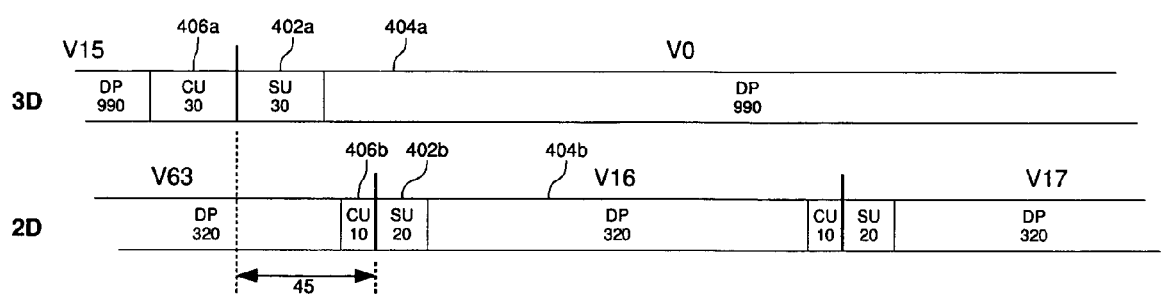
FIG. 4 is a timing diagram illustrating a three-phase voice processing sequence for the 2D voice engine, and for the 3D voice engine of FIG. 2, in accordance with the present invention.

FIG. 4 is a timing diagram illustrating the three-phase voice processing sequence for the 2DVE 114 and for the 3DVE 112 of FIG. 2, in accordance with the present invention. Referring to FIGS. 2 and 4 together, during a first phase ("setup phase") 402b and 402a, for the 2DVE 114 and 3DVE 112, respectively, a pipeline for a voice is setup. Next, during a second phase ("data processing phase") 404b and 404a, for the 2DVE 114 and the 3DVE 112, respectively, one frame's worth of sound samples for the voice is processed. Finally, during a third phase ("cleanup phase") 406b and 406a, for the 2DVE 114 and 3DVE 112, respectively, state information for the voice is stored.

As shown in FIG. 4, the phases of the 2DVE 114 are time staggered relative to the phases of the 3DVE 112. More specifically, the cleanup and setup phases 406b and 402b of the 2DVE 114 are time offset such that they do not overlap with the cleanup and setup phases 406a and 402a of the 3DVE 112. In a preferred embodiment, the setup phase 406b of the 2DVE 114 begins when the cleanup phase 402a of the 3DVE 114 ends. Accordingly, without contention, the 3DVE 112 and 2DVE 114 can share the voice control RAM 106 through a single port. Additionally, both the 2DVE and 3DVE are designed to fetch sound from the sound data RAM at regular intervals during the Data Processing phase. Starting with the first cycle of the Data Processing phase, the 2DVE 114 fetches sound samples from the sound data RAM 108 every 10 cycles. Starting with the first cycle of the Data Processing phase, the 3DVE 112 fetches sound samples from the sound data RAM 108 every 30 cycles. The time offset of the phases of the 2DVE 114 and 3DVE 112 remove contention for the sound data RAM 108, and so the 2DVE 114 and 3DVE 112 can share the sound data RAM 108 through a single port.

Referring to the phases of the 2DVE 114, the setup phase 402b is 20 cycles long, and is used to fetch the voice control block out of the voice control RAM 106 and set up any necessary parameters that will be used during the data processing phase. This includes calculating a new pitch value, a new envelope value, and a new volume value, and creating the incremental steps that will be added for each sound sample.

The data processing phase 404b takes place when the sound samples are streamed through the 2DVE 114 at a rate of 1 sample every 10 cycles. During these 10 cycles, the sound sample is decompressed and interpolated based on the pitch, and is adjusted for left and right gain. The final sound is scaled for reverb and the four data samples are sent to the mix module.

The cleanup phase 406b is 10 cycles long and takes place when the temporary registers, which need to be saved between frames, are stored back to the voice control RAM 106. During this phase, the 2DVE 114 also makes the memory request (or two requests if a loop is encountered) for the "next" channel (if that channel is enabled). The "next" channel is the current channel plus "3", since the sound data for the 2DVE 114 is triple-buffered. The sound data for the "next" channel replaces the sound data for the current channel in the sound data RAM.

If the current voice is disabled, the 2DVE 114 skips the setup phase and data processing phase, and jumps to the cleanup phase. If a "key on" is triggered for the voice, the 2DVE 114 writes a voice control block with initial values. Otherwise, the 2DVE 114 does not update the voice control block. The 2DVE 114 then processes the memory request for the "next" channel as described previously.

Referring to the phases of the 3DVE 112, the setup phase 402a is 30 cycles long, and is used to fetch the voice control block out of the voice control RAM 106, fetch the HRTF coefficients out the coefficient ROM, and set up any necessary parameters that will be used during the data processing phase. This includes calculating a new pitch value, a new envelope value, and a new volume value, and includes creating the incremental steps that will be added for each sound sample.

The data processing phase 404a takes place when the sound samples are streamed through the 3DVE 112 at a rate of 1 sample every 30 cycles. During the 60 total cycles of processing (2 stages of 30 cycles each), 10 of the cycles are similar to the 2DVE 114. The 10 cycles are used for decoding the samples and processing them for pitch and gain. The remaining cycles are used for implementing a low-pass filter and 3D positioning, which are performed by finite impulse response (FIR) filters. After new data is placed in the history buffer, data is read, at the correct delay amount, from the history buffer. Also, reverberation data is read from the appropriate delay position in the history buffer. The reverb sound is scaled for reverb, and the final four data samples are sent to the mix module. A signal notifies the mix module 116 whether the data should be placed in the 3D data frame in the reverb RAM 118 or in the 2D data frame (if the 3D control bit is off in the voice control block).

The cleanup phase 406a is 30 cycles long and is implemented when the temporary registers (which are saved between frames) are stored back to the voice control RAM. The history buffer does not need to be updated, since data is placed in the history buffer as part of the data processing phase. During this phase, the 3DVE 112 also makes the memory request (or two requests if a loop is encountered) for the "next" channel (if that channel is enabled).

The next channel is the current channel plus "2", since the sound data for the 3DVE 112 is double-buffered. The sound data for the next channel replaces the sound data for the current channel in the sound data RAM 108.

If the current voice is disabled, the 3DVE 112 skips the setup phase and data processing phase, and jump to the cleanup phase. If key on is triggered for the voice, the 3DVE 112 then writes the voice control block and the 3D history block with initial values. Otherwise, the 3DVE 112 will not update these blocks. The 3DVE 112 then makes the memory request for the next channel as described previously.

The 3DVE 112 engine takes three times as long to process a voice as does the 2DVE 114 engine for all three phases. The 2DVE 114 is 20 cycles for setup, 320 cycles for data processing, and 10 cycles for clean up, for a total of 350 cycles. The 3DVE 112 is 30 cycles for setup, 990 cycles for data processing, and 30 cycles for clean up, for a total of 1050. This allows the two engines to remain in sync, and provides a way for eliminating contention for the voice control RAM and sound data RAM. The pipelines are staggered by 45 cycles so that the access cycles of the pipelines do not overlap, and the sound data accesses do not overlap.

Referring again to FIG. 2, the PIF 102 controls the AMBA high-performance bus (AHB) slave interface and handles the read and write requests from the main processor. The PIF 102 also contains the global registers. Register writes complete in one cycle, and register reads complete in two cycles. Accesses to the voice control RAM typically require two cycles, but may be extended if there is contention with the 2DVE 114 or the 3DVE 112. This is also true for accesses to the global registers, which are held in the reverb RAM 118, which may experience contention with the accessing of the global registers by the mix module 116. The PIF 102 contains one write buffer so that single writes will not stall the main processor, even when contention occurs.

The MRE 104 has an AHB master port by which sound data is fetched from the external memory. The amount of memory requested is determined by the pitch and data format of the input sound, with a maximum request of 17 32-bit words (33 16-bit PCM samples).

The sound data RAM 108 is 90×32, and holds five 17-word frames of sound samples. Two of the five frames are dedicated to the 3DVE 112, and three of the five frames are dedicated to the 2DVE 114. Three modules access the sound data RAM 108: the MRE 104, the 2DVE 114, and the 3DVE 112. The MRE 104 has a lower priority access, and it contains two 32-bit words of buffering to hold data, which cannot be written immediately to the RAM.

Accesses from the MRE 104 are typically bursts of up to 16 words. Accesses from the 2DVE 114 occur at a maximum rate of two 16-bit samples (one 32-bit word) every 20 cycles. Accesses from the 3DVE 112 occur at a maximum rate of two 16-bit samples (one 32-bit word) every 60 cycles.

Contention between 2DVE 114 and 3DVE 112 accesses is avoided by staggering the pipelines of the 2DVE 114 and 3DVE 112 by 45 cycles, where the 2DVE 114 starts 45 cycles later than the 3DVE 112.

Since the number of 3DVE 112 processing cycles is exactly 3 times the number of processing cycles of the 2DVE 114, their sound data RAM accesses do not fall on the same cycle.

The worst-case contention scenario is when both a 2DVE 114 access and 3DVE 112 access occur during a 16-cycle MRE 104 burst write. In this case, two cycles are stolen from the MRE 104 access, and so the MRE 104 must contain two words of buffering.

The voice control RAM 106 holds the voice control blocks for the 64 channels. The PIF 102, the 2DVE 114, and the 3DVE 112 access this RAM. The PIF 102 has a lower priority, and the PIF 102 has a one 32-bit write buffer, which exists so that the main processor does not need to stall for simple writes. For multiple writes, or for reads, the ready signal is not be asserted until the transaction is completed.

Accesses from the PIF 102 are single word writes, and can happen at any time. Accesses from the 2DVE 114 and the 3DVE 112 occur during the setup phase and the cleanup phase. During the setup phase, the 2DVE 114 and the 3DVE 112 need to fetch 16 words from the voice control RAM 106. During the cleanup phase, the 2DVE 114 and the 3DVE 112 need to write 6 words back to the voice control RAM 106, and read 4 words in order to make a new sound data memory request. The 2DVE 114 has one setup phase and one cleanup phase every 350 cycles. The 3DVE 112 has one setup phase and one cleanup phase every 1050 cycles.

Since the AHB architecture allows only 4-word, 8-word, or 16-word fixed-length bursts, and bursts are not allowed to cross 1 KB boundaries, the MRE 104 includes logic to make the most efficient requests to the memory controller. If the request is 4, 8, or 16 words, the MRE 104 makes a fixed-length, incremental burst. If the request is for a different size, the MRE 104 uses an incrementing burst of unspecified length, and terminates the burst at the proper time. When a requested memory transaction requires crossing a 1 KB boundary, the MRE 104 divides the request into two separate requests. The MRE 104 paces its memory requests to the memory controller so that there are at least 8 cycles between transactions to the memory controller. This is to allow other devices to access the memory controller.

As described above, contention between 2DVE 114 and the 3DVE 112 accesses is avoided by staggering the pipelines of the 2DVE 114 and the 3DVE 112 by 45 cycles, where the 2DVE 114 starts 45 cycles later than the 3DVE 112. Since the number of 3DVE 112 processing cycles is exactly 3 times the number of processing cycles of the 2DVE 114, the spacing of the 2DVE 114 and 3DVE 112 access is maintained, and their sound data RAM 108 accesses do not fall on the same cycle.

The worst case latency scenario for the main processor would be if the 2DVE 114 or 3DVE 112 were doing 16 reads in a row during the setup phase. In this case, the main processor access would experience a 16-cycle delay.

The 3D history RAM 110 holds the history buffer for the 16 3D voices. The only module to access the 3D history RAM is the 3DVE 112. Two stages of the 3DVE 112 pipeline access the 3D history RAM. However, the need for a two-port RAM is alleviated by reading out 32 bits (two samples) of the RAM at a time. The 3D history RAM 110 alternates between giving stage 1 two samples and giving stage 2 two samples. The 3DVE 112 requires logic to maintain this correctly, since the data samples may not be aligned on memory word boundaries. When misaligned data is needed, a prefetch is performed during the setup phase, so that the data flow can be maintained. The prefetching is autonomous.

The history buffer for each voice is implemented as a circular buffer, and is read and written during the data processing phase. A history buffer start field in the voice control block acts as a pointer to the start of the history buffer. Each time a new sound sample is added to the history buffer, the history buffer start field is incremented (circularly).

The Reverb RAM 118 is a two-port RAM; one port is shared by the mix module 116 and the PIF 102, and the other port is shared by the MRE 104, the GEE 120, and the DACIF 122. The mix module 116 has priority over the processor interface on the first port. The priority on the second port, from highest to lowest, is the DACIF 122, the MRE 104, and the GEE 120. The PIF 102, the MRE 104, and the GEE 120 retry their accesses whenever they are denied access to the reverb RAM 118.

The double-buffered frames from the mix module exist so that the mix module can update data for the current frame in the reverb RAM 118 while the GEE 120 uses the previous frame's data. The double-buffered frames to the DAC exist so that the DACIF 122 can access the previous frame while the GEE 120 generates the final sound data for the current frame.

The mix module 116 receives data from the 2DVE 114 and 3DVE 112, and adds it to the values in the appropriate data frames in the reverb RAM 118. Since it performs 2 reads and 2 writes for the 2DVE 114 every 10 cycles, and 2 reads and 2 writes for the 3DVE 112 every 30 cycles, it has its own port to the reverb RAM 118. The mix module 116 allows separate buffers for 2D voices, 3D voices (which may require cross-talk cancellation, performed by the GEE 120), and reverb (combinations of scaled 2D and 3D voices).

At the beginning of every frame, the data frames in the reverb RAM 118, where the mix module adds its data, are cleared. The GEE 120 clears these data frames before the end of each frame.

The GEE 120 performs all global processing, and is basically a 1-stage general processor with a state machine controlled program utilizing the reverb RAM 118 as its memory. The GEE 120 performs reverb in hardware in a frame-based fashion.

The GEE 120 also performs the cross-talk cancellation. In order to achieve a 3D effect over speakers, cross-talk cancellation is performed on the 3D voices. This is done after all of the 3D voices have been summed together.

At the beginning of each frame, the GEE 120 requests direct memory access (DMA) transactions, which fetch reverb data from external memory. While the GEE 120 is waiting for the requests to be completed, it performs the necessary calculations for non-reverb global effects. After all the DMA fetches have been completed, the GEE 120 performs the reverb calculations and generates 4 frames of data to be stored back to the external memory.

In addition to the global effects, the GEE 120 controls the clearing of double-buffered data frames in the reverb RAM 118. After doing its processing, the GEE 120 clears the 2D and 3D mix buffers which become filled by the 2DVE 114 and 3DVE 112 in the next frame. At the beginning of each frame, the GEE 120 clears the buffers that it will write into during that frame.

The following is a list of GEE 120 functions:
Clearing and switching the double-buffered data frames in the reverb RAM 118.
Updating the four LFOs.
Updating the four global envelopes.
Performing reverb.
Performing cross-talk cancellation of the 3D final mix.
Updating and applying master volume to the final mix.

The DACIF 122 receives data from the reverb RAM 118 in the system clock domain and gives it to the DAC in the DAC clock domain. The DACIF 122 has a 32-bit register, which runs on a sound processor system clock, and is loaded from the reverb RAM 118. The DACIF 122 delivers this data serially to the DAC in the DAC clock domain. When the data in that register has been sent to the DAC, a signal is synchronized to the system clock domain and is used to fetch another 32-bit word from the reverb RAM 118. Because a clock boundary exists in this module, care is taken to properly synchronize signals across the boundary, including the reset signal.

Upon reset, the DACIF 122 enters a state in which it is sending "0" data continuously to the DAC, and is not fetching data from the reverb RAM 118 (which may contain uninitialized data). The DACIF 122 waits until three "start of frame" events have occurred before starting to fetch data from the reverb RAM 118. By this time, the GEE 120 will have put valid data in the reverb RAM 118.

Also, upon the reset, the sound processor state machines enter a reset state, and the voice disable bits for all voices are set to "1". Also, an enable register is reset to "0". This causes the sound engines to run in a low-power mode, where data is not fetched from the external memory, and no processing takes place.

The main processor sets up the enable register to enable the DACIF 122 to set a desired number of 2D and 3D voices, and to set up the other global registers to be used. The main processor then issues the "key on" to all the voices to be used. Issuing the key on while a voice is disabled causes the sound processor to reset voice control block and to reset a 3D history block (for 3D voices) for the voice during the next frame.

Once the main processor is sure that at least one full frame (time) has passed since the key on was recognized, it can enable the desired voices.

Upon the reset, the 2DVE 114 and 3DVE 112 waits for a "start of frame" event to begin processing of the next frame. Also, upon the reset, the GEE 120 begins global processing. It clears the DAC "out data" frame and then does global processing. At the end of the frame, it clears the 2D and 3D mix buffers.

The 2DVE 114 and the 3DVE 112 perform the voice processing as described previously. When they have finished all 64 voices, or a specified lesser number, the 2DVE 114 and the 3DVE 112 stop processing. At this time, the sound data blocks for voices 0, 1, 16, 17, and 18 would have been requested. It waits until the beginning of the next frame to begin processing again.

If the 2DVE 114 and 3DVE 112 are processing a voice for which the sound data has not yet been received from the memory controller, the 2DVE 114 and the 3DVE 112 process the voice as if it were disabled. As such, the setup and data processing phases are skipped, and the sound data for the next channel is fetched (if a MRE 104-queue slot is available).

The GEE 120 performs self-checking to make sure that it can finish its processing within one frame. The only events that would cause the GEE 120 to fall behind are the external memory accesses for reverb processing. The GEE 120 defines a cut-off time at which the external memory accesses should complete. If by that time the external memory accesses are not complete, the GEE 120 asserts a signal to the MRE 104 to cancel its memory requests, and the GEE 120 skips reverb processing.

Figure 5:
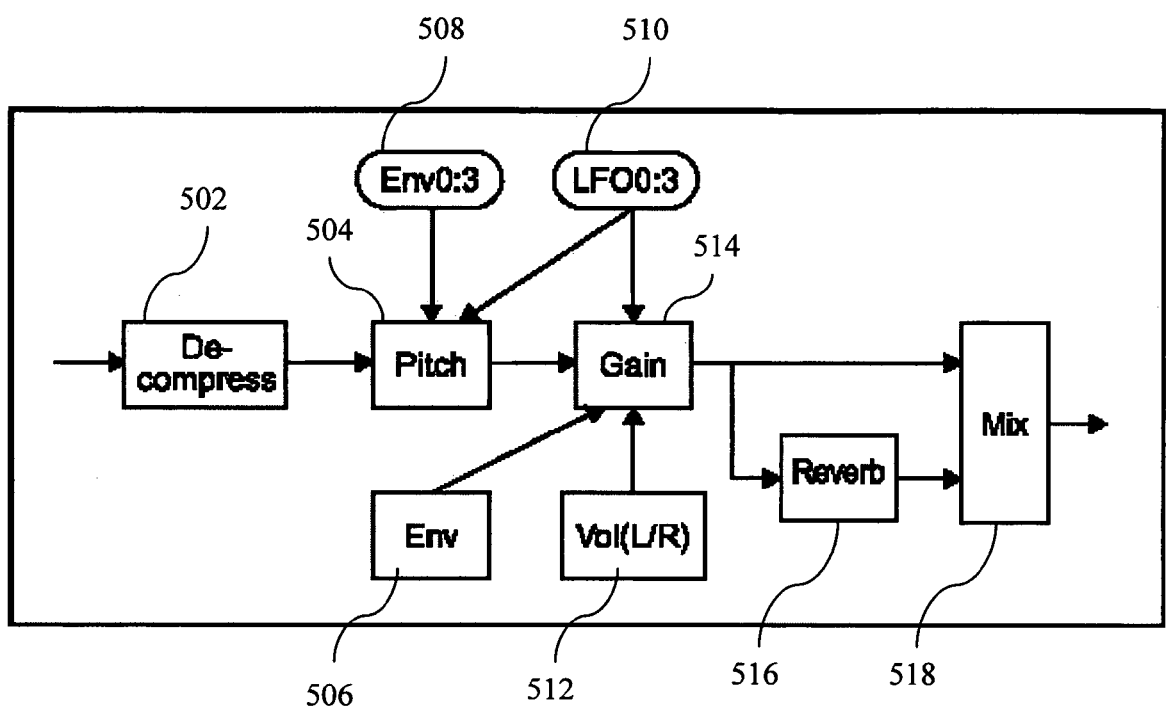
FIG. 5 is a signal flow diagram of a 2D voice engine, which can be used to illustrate the signal flow of the 2D voice engine of FIG. 2, in accordance with the present invention.

FIG. 5 is a signal flow diagram of a 2DVE, which can be used to illustrate the signal flow of the 2DVE 114 of FIG. 2, in accordance with the present invention. Each voice can be considered a "process" that must be performed by hardware. The necessary inputs to process a voice are the control parameters for a voice, the state (history), and the new source sound data. A decompress block 502 decodes compressed sound data, for example, adaptive differential pulse code modulation (ADPCM) format sound. A pitch block 504 performs pitch shifting. An envelope block 506 generates an envelope and controls the gain modification of the sound data over time. A global envelope block 508 globally controls the pitch over time. A low-frequency oscillator (LFO) 510 controls the pitch and the gain over time. In this particular embodiment there are four global envelopes and four LFOs, where multiple voices can use the global envelopes and the LFOs. A volume (left/right) block 512 generates volume and also controls the gain modification of the sound data over time. A gain block 514 modifies the sound data magnitude. A reverb block 516 scales the sound data before it is used in a reverb algorithm. A mix block 518 mixes signals from the gain block 514 and the reverb block 516.

Figure 6:
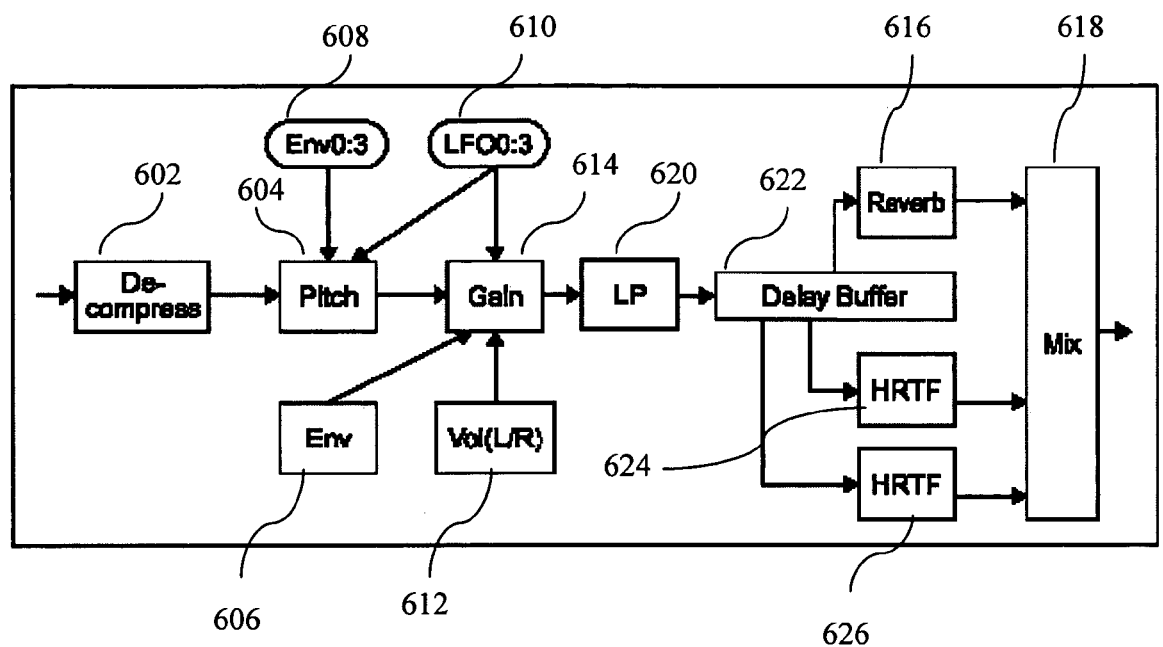
FIG. 6 is a signal flow diagram of a 3D voice engine, which can be used to illustrate the signal flow of the 3D voice engine of FIG. 2, in accordance with the present invention.

FIG. 6 is a signal flow diagram of a 3DVE, which can be used to illustrate the signal flow of the 3DVE 112 of FIG. 2, in accordance with the present invention. The signal flow diagram of FIG. 6 includes a decompress block 602, a pitch block 604, an envelope block 606, a global envelope block 608, an LFO block 610, a gain block 614, a reverb block 616, and a mix block 618 which function similarly to the like-named blocks of FIG. 5. The signal flow diagram also includes a low-pass filter block (LPF) 620, a delay buffer block 622 and two head related transfer function (HRTF) blocks 624 and 626. The LPF block 620 performs a low-pass filter function to emulate obstruction and occlusion. The delay buffer block 622 holds a history of generated sound in order to create an inter-aural time difference for 3D voices. The HRTF blocks 624 and 626 perform filtering of the sound data to provide the listener with the perception of 3D localization.

According to the system and method disclosed herein, the present invention provides numerous benefits. For example, it provides an efficient architecture, which results in low-power operation. Embodiments of the present invention also provide effective 3D positioning, including cross-talk cancellation and occlusion/obstruction filtering.

A method and system for implementing a sound processor has been disclosed. The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made by one of ordinary skill in the art without departing from the spirit and scope of the appended claims.

I claim:

1. A sound processor comprising:
a first voice engine;
a second voice engine, wherein a multi-phase voice processing sequence comprising at least three phases is employed for the first voice engine and for the second voice engine, and wherein the first and second voice engines are synchronized such that the multi-phase voice processing sequence for one of the first and second voice engines takes an integer multiple of a predetermined number of cycles longer than the multi-phase voice processing sequence for the other of the first and second voice engines; and
at least one single-port memory unit, wherein at least one of the at least three phases of the first voice engine and a corresponding phase of the at least three phases of the second voice engine are time offset, wherein the time offset enables the first and second voice engines to share the at least one memory unit without contention.

2. The sound processor of claim 1 further comprising a mixer unit, wherein the mixer unit allows separate buffers for 2-dimensional (2D) voices, 3-dimensional (3D) voices, and reverb.

3. The sound processor of claim 2 wherein the reverb comprises combinations of scaled 2D and 3D voices.

4. The sound processor of claim 1 further comprising a global effects engine, wherein the global effects engine performs reverb in a frame based fashion.

5. The sound processor of claim 1 wherein the sound processor performs autonomous pre-fetching of sound data from memory.

6. The sound processor of claim 1 wherein the at least one memory unit comprises a plurality of memory units.

7. The sound processor of claim 6 wherein the plurality of memory units comprise a voice control RAM and the sound data RAM.

8. The sound processor of claim 1 wherein the integer multiple is at least 3.

9. The sound processor of claim 1 wherein first voice engine is a 3-dimensional voice engine.

10. The sound processor of claim 1 wherein second voice engine is a 2-dimensional voice engine.

11. A system for processing sound, the system comprising:
a main processor;
a memory controller coupled to the main processor, wherein the memory controller is adapted to be coupled to a main memory unit; and
a sound processor coupled to the main processor and to the memory controller, the sound processor comprising:
a first voice engine;
a second voice engine, wherein a multi-phase voice processing sequence comprising at least three phases is employed for the first voice engine and for the second voice engine, and wherein the first and second voice engines are synchronized such that the multi-phase voice processing sequence for one of the first and second voice engines takes an integer multiple of a predetermined number of cycles longer than the multi-phase voice processing sequence for the other of the first and second voice engines; and
at least one single-port memory unit, wherein at least one of the at least three phases of the first voice engine and a corresponding phase of the at least three phases of the second voice engine are time offset, wherein the time offset enables the first and second voice engines to share the at least one memory unit without contention.

12. The system of claim 11 further comprising a mixer unit, wherein the mixer unit allows separate buffers for 2-dimensional (2D) voices, 3-dimensional (3D) voices, and reverb.

13. The system of claim 12 wherein the reverb comprises combinations of scaled 2D and 3D voices.

14. The system of claim 11 further comprising a global effects engine, wherein the global effects engine performs reverb in a frame based fashion.

15. The system of claim 11 wherein the sound processor performs autonomous pre-fetching of sound data from memory.

16. The system of claim 11 wherein the at least one memory unit comprises a plurality of memory units.

17. The system of claim 16 wherein the plurality of memory units comprise a voice control RAM and the sound data RAM.

18. The system of claim 11 wherein the integer multiple is at least 3.

19. The system of claim 11 wherein first voice engine is a 3-dimensional voice engine.

20. The system of claim 11 wherein second voice engine is a 2-dimensional voice engine.

21. A method for processing sound, the method comprising:
- providing a first voice engine and a second voice engine;
- employing a multi-phase voice processing sequence comprising at least three phases for the first voice engine and for the second voice engine;
- providing at least one memory unit;
- offsetting at least one of the at least three phases of the first voice engine and a corresponding phase of the at least three phases of the second voice engine, wherein the offset enables the first and second voice engines to share at least one memory unit without contention; and
- synchronizing the first and second voice engines such that the multi-phase voice processing sequence for the first voice engine is an integer multiple of a predetermined number of cycles longer than the multi-phase voice processing sequence for the second voice engine.

22. The method of claim 21 wherein the employing step comprises:
- setting up a pipeline for a voice;
- processing at least one frame's worth of sound samples; and
- storing back state information for the voice.

23. The method of claim 21 further comprising performing reverb in a frame based fashion.

24. The method of claim 23 wherein the reverb is performed by a global effects engine.

25. The method of claim 21 further comprising performing autonomous pre-fetching of sound data from memory.

26. The method of claim 21 wherein the integer multiple is at least 3.

27. The method of claim 21 wherein the first voice engine is a 3-dimensional voice engine.

28. The method of claim 21 wherein the second voice engine is a 2-dimensional voice engine.

29. The method of claim 21 wherein the at least one memory unit is a single-port memory unit.

30. A computer readable medium containing program instructions for processing sound, the program instructions which when executed by a computer system cause the computer system to execute a method comprising:
- providing a first voice engine and a second voice engine;
- employing a multi-phase voice processing sequence comprising at least three phases for the first voice engine and for the second voice engine;
- providing at least one memory unit;
- offsetting at least one of the at least three phases of the first voice engine and a corresponding phase of the at least three phases of the second voice engine, wherein the offset enables the first and second voice engines to share at least one memory unit without contention; and
- synchronizing the first and second voice engines such that the multi-phase voice processing sequence for the first voice engine is an integer multiple of a predetermined number of cycles longer than the multi-phase voice processing sequence for the second voice engine.

31. The computer readable medium of claim 30 wherein the employing step comprises program instructions for:
- setting up a pipeline for a voice;
- processing at least one frame's worth of sound samples; and
- storing back state information for the voice.

32. The computer readable medium of claim 30 further comprising program instructions for performing reverb in a frame based fashion.

33. The computer readable medium of claim 32 wherein the reverb is performed by a global effects engine.

34. The computer readable medium of claim 30 further comprising program instructions for performing autonomous pre-fetching of sound data from memory.

35. The computer readable medium of claim 30 wherein the integer multiple is at least 3.

36. The computer readable medium of claim 30 wherein first voice engine is a 3-dimensional voice engine.

37. The computer readable medium of claim 30 wherein the second voice engine is a 2-dimensional voice engine.

38. The computer readable medium of claim 30 wherein the at least one memory unit is a single-port memory unit.

* * * * *